Patented Oct. 22, 1946

2,409,862

UNITED STATES PATENT OFFICE 2,409,862

PRODUCTION OF CHLORINE DIOXIDE

Willis S. Hutchinson, St. Paul, Minn., assignor to The Mathieson Alkali Works, Inc., New York, N. Y., a corporation of Virginia No Drawing. Application July 12, 1944, Serial No. 544,644

6 Claims. (Cl. 23—152)

This invention relates to the generation of chlorine dioxide and more particularly to an improved process whereby chlorine dioxide may economically be produced in constant or readily controlled quantities and concentrations.

Chlorine dioxide has many uses in the industry. For instance, its use has heretofore been proposed in the bleaching of flour. However, because of its unstable character, chlorine dioxide cannot be produced in bulk and stored until needed. Consequently, it is necessary to generate the chlorine dioxide at the place where it is to be used and only in immediately required quantities.

These requirements have occasioned considerable difficulty by reason of the fact that the immediate demand for chlorine dioxide will usually vary over a considerable range and requires considerable flexibility and careful control of the generation.

A further difficulty heretofore experienced has been the necessity of maintaining the chlorine dioxide at a safe concentration throughout the generating and processing apparatus. It is generally necessary, in order to avoid explosion hazards, to handle chlorine dioxide in a rather high state of dilution with air or some other inert gaseous medium. The handling of chlorine dioxide in concentrations such that the partial pressure of the chlorine dioxide is equal to about 70 mm. of mercury or higher is usually unsafe. For commercial purposes, for instance in the treatment of flour, the partial pressure of the chlorine dioxide in such chlorine dioxide-air mixtures should not usually exceed about 30 mm., and preferably should be considerably lower. Thus, the adjustment and control of the rate of generation and the concentration of chlorine dioxide in the resultant mixture so as to avoid hazardous concentrations at any point in the apparatus is of major importance.

Various reactions are known whereby chlorine dioxide may be generated. For instance, it has heretofore been recognized that chlorine dioxide may be generated by reacting hydrochloric acid, with an aqueous solution of a chlorate, for instance potassium chlorate. Though the precise reaction is not definitely known, it may be represented generally by the following equation:

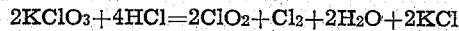

By this reaction, chlorine gas is generated in addition to the chlorine dioxide.

It has further been recognized that chlorine dioxide may be generated free from chlorine by reacting an acid, for instance hydrochloric acid, with an aqueous solution of a chlorite, for instance sodium chlorite.

Operations involving these reactions for the generation of chlorine dioxide have heretofore been subject to practical difficulties in the regulation and control of the rate of the chlorine dioxide generation. The present invention relates particularly to an improved method of controlling the reactions whereby chlorine dioxide may be generated at carefully regulated and controlled rates and concentrations.

In accordance with my present invention, hydrochloric acid vapors, in admixture with an inert diluent gas, air for instance, are brought into contact with the reacting material, such as a chlorate or a chlorite of an alkali or alkaline earth metal in solid form. The acid vapor reacts with the chlorate or chlorite to generate chlorine dioxide and the diluent gas serves to dilute the chlorine dioxide, as formed, to a safe concentration. The rate of reaction and, accordingly, the rate at which chlorine dioxide is generated, is dependent upon the rate at which the acid vapors are passed to the generating zone, and the concentration of the resultant chlorine dioxide gas is regulated by varying the proportions of acid vapor and diluent gas passed to the reaction zone. As the diluent of the acid vapors, air has been found satisfactory.

The invention provides a novel and practical method of preparing and regulating and controlling the concentration and rate of flow of the reacting mixture passed to the generating zone.

The admixture of acid vapor and diluent gas passed to the reaction zone is prepared, in accordance with my improved method, by passing the diluent gas through a solution of constant concentration of hydrochloric acid in an inert liquid such as water, the concentration of the solution being maintained constant by any suitable means. In passing through the dilute acid, the air, for instance, will pick up a portion of the acid, the amount depending upon the quantity of air passed therethrough, the concentration of the acid solution, the temperature and pressure conditions and the extent of contact between the air and the acid solution. By varying these conditions, the concentration of acid in the acid vapor mixture passed to the generator may be varied over a considerable range and, by maintaining constant a particular set of conditions, the acid concentration of the mixture passed to the generator may be maintained uniform.

Thus, having established operating conditions which will produce an acid vapor mixture of such concentration as will result in a sufficiently dilute chlorine dioxide-gas mixture, the rate of generation of such chlorine dioxide-gas mixture may be varied by varying the rate at which air is passed through the acid solution.

My invention avoids the necessity of measuring and regulating the flow of corrosive acid vapors, it being necessary merely to control the rate at which air or other inert gas is passed in contact with the acid solution.

It is known that hydrochloric acid forms a constant boiling mixture with water under atmospheric pressure containing 20.24% HCl and boiling at about 110° C. It has also been recognized that, when air is blown through an aqueous HCl solution, HCl and water will be vaporized therefrom and carried off by the air in such proportions that the solution will finally attain a constant concentration, the particular concentration depending upon temperature and pressure. Thus, if air be passed through an aqueous HCl solution at atmospheric pressure and 15° C., the solution will attain a constant concentration of 25.2% HCl. It has also been shown that at 0° C., the residual solution will attain a constant composition of about 25% HCl and, as the temperature is raised, the concentration of HCl in the residual solution decreases until at 100° C. the concentration of HCl in the residual solution is 20.7%. These constant concentrations will vary somewhat with the pressure.

The characteristic of such aqueous acid solutions to retain constant concentrations upon the passage of air therethrough, is with advantage utilized in accordance with my present invention in conjunction with other operating conditions, to maintain constant the amount of acid picked up by the diluent gas and, consequently, the concentration of acid in the acid vapor mixture passed in contact with the chlorite or chlorate.

The concentration of acid in the acid-air mixture is limited to that at which the air becomes saturated at the particular temperature and pressure employed. With this exception, the proportion of acid to air may be varied over a considerable range, as previously noted, by varying the temperature, pressure and extent of contact between the air and the acid solution. For example, the air is with advantage passed upwardly through a column of the acid solution of predetermined and constantly maintained concentration and height. Under constant temperature and pressure conditions, the amount of acid picked up by the air, and consequently the ratio of acid to air in the acid-gas mixture, may be regulated by varying the height of the column of liquid through which the air is passed. As the rate of air flow is increased, the acid concentration of the gases passing from the acid column may be found to be slightly lower than such concentration where a lower rate of air flow is used. However, for practical purposes, this variation in concentration is not usually sufficiently great to interfere with the operation. Where closer control is required, the height of the column may be somewhat increased to provide greater contact. Preferably, a plurality of acid columns is maintained and used concurrently, where the demand for chlorine dioxide is greater than can be supplied by a single column at the optimum rate of air flow.

Though the invention is applicable to an operation in which either a chlorate or a chlorite is used as the reactant, the use of a chlorite is generally preferable as by its use chlorine dioxide free from elemental chlorine may be produced.

As previously noted, the concentration of the constant-concentration acid solution will depend upon the prevailing temperature and pressure. From information available to the art, concentrations for particular operating temperatures and pressures may be readily determined. For example, an aqueous hydrochloric acid solution containing about 25% HCl may be used with advantage under normal temperatures and pressures. At higher temperatures, somewhat lower concentrations are used. The temperature, pressure and concentration may be so correlated in the operation as to maintain a constant concentration of the acid in the column. At elevated temperatures, the rate of reaction of the acid with the chlorite tends to be too great and therefore operation at about normal temperature is generally recommended.

The rate at which the acid is fed to the generator, under any particular operating conditions, may be conveniently determined by maintaining a constant volume of the acid solution and measuring the rate at which acid must be supplied to maintain the volume constant. From this value and the volume of air supplied, the concentration of acid vapor passed to the generator may be readily determined.

Concentrations of chlorine dioxide suitable for the bleaching of flour may be produced, for instance, by passing 200 cc. of air per minute at normal temperature through a 4 inch head of an aqueous hydrochloric acid solution containing about 25% HCl, and conducting the air-HCl-water mixture through a column of potassium chlorate crystals 8 inches in height and ½ inch in diameter.

Similar procedure may be followed where a chlorite is substituted for the chlorate. For instance, 300 c. c. of air per minute at normal temperature may be passed through an aqueous hydrochloric acid solution containing about 25% HCl, and the resultant gaseous mixture passed through a tube 8 inches long and ½ inch inside diameter filled with sodium chlorite.

The acid vapor constituent of the mixture will react with the chlorite to form chlorine dioxide and the rate of production of chlorine dioxide, at a given concentration, may be controlled by regulating the rate at which the air is passed through the column of acid or by using a plurality of such columns while maintaining a constant rate of air flow through each column.

I claim:

1. In the generation of chlorine dioxide by reacting hydrochloric acid with a chlorine-containing compound of the class consisting of the chlorites and chlorates of the alkali and alkaline earth metals, the improvement which comprises passing an inert gas in contact with a body of a solution of the hydrochloric acid in an inert liquid and thereby forming a gaseous mixture of the hydrochloric acid and inert gas, passing said gaseous mixture in contact with the chlorine-containing compound in solid form, and maintaining the concentration of the hydrochloric acid in said solution substantially constant.

2. In the generation of chlorine dioxide by reacting hydrochloric acid with a chlorine-containing compound of the class consisting of the chlorites and chlorates of the alkali and alkaline earth metals, the improvement which comprises passing air in contact with a body of an aqueous solution of the hydrochloric acid and thereby forming a gaseous mixture of the hydrochloric acid and air, and passing said mixture in contact with the chlorine-containing compound in solid form, the concentration of the hydrochloric acid in said solution being that at which, under prevailing pressure and temperature conditions, no substantial change in the concentration of the hydrochloric acid in the solution takes place on passage of air through the solution.

3. In the generation of chlorine dioxide by reacting hydrochloric acid with a chlorine-containing compound of the class consisting of the chlorites and chlorates of the alkali and alkaline earth metals, the improvement which comprises passing air in contact with a body of an aqueous solution of hydrochloric acid and thereby forming a gaseous mixture of the hydrochloric acid and air, passing said mixture in contact with the chlorine-containing compound in solid form, and maintaining the temperature, pressure and concentration of the acid in said solution substantially constant, the introduction of the air into said solution being at such a rate that a desired rate of generation of chlorine dioxide is obtained.

4. In the generation of chlorine dioxide by reacting hydrochloric acid with a chlorine-containing compound of the class consisting of the chlorites and chlorates of the alkali and alkaline earth metals, the improvement which comprises passing air in contact with a body of an aqueous solution of hydrochloric acid and thereby forming a gaseous mixture of the hydrochloric acid and air, passing said mixture in contact with the chlorine-containing compound in solid form, maintaining the temperature, pressure and concentration of the acid in said solution substantially constant, the extent of contact of the air with said body of acid being such that the generated chlorine dioxide is of the desired concentration.

5. In the generation of chlorine dioxide by reacting hydrochloric acid with a chlorine-containing compound of the class consisting of the chlorites and chlorates of the alkali and alkaline earth metals, the improvement which comprises reacting the hydrochloric acid, in gaseous form and in admixture with an inert diluent gas, with the chlorine-containing compound in solid form.

6. In the generation of chlorine dioxide by reacting hydrochloric acid with a chlorine-containing compound of the class consisting of the chlorites and chlorates of the alkali and alkaline earth metals, the improvement which comprises reacting the hydrochloric acid, in gaseous form and in admixture with air, with the chlorine-containing compound in solid form.

WILLIS S. HUTCHINSON.